Figure 1:
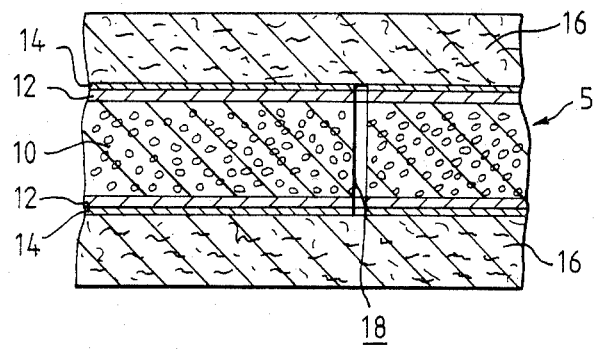

United States Patent [19]

Pollock

[11] Patent Number: 4,525,406
[45] Date of Patent: Jun. 25, 1985

[54] THERMAL INSULATION LAYER

[75] Inventor: James F. Pollock, Maidenhead, England

[73] Assignee: Secretary of State for United Kingdom Atomic Energy Authority, London, England

[21] Appl. No.: 588,725

[22] Filed: Mar. 12, 1984

[30] Foreign Application Priority Data

Mar. 15, 1983 [GB] United Kingdom ................. 8307167
Jul. 12, 1983 [GB] United Kingdom ................. 8318861

[51] Int. Cl.³ .......................... B32B 3/10; B32B 3/12; B32B 5/32; B32B 15/00
[52] U.S. Cl. .................................... 428/137; 428/138; 428/166; 428/172; 428/178; 428/285; 428/316.6; 428/319.1; 428/913
[58] Field of Search ............... 428/131, 137, 138, 166, 428/172, 178, 315.5, 315.7, 315.9, 71, 75, 76, 284, 285, 316.6, 319.1, 913

[56] References Cited

U.S. PATENT DOCUMENTS

| 1,345,046 | 6/1920 | Wedlock | 428/316.6 |
| 4,136,222 | 1/1979 | Jonnes | 428/178 |
| 4,420,521 | 12/1983 | Carr | 428/138 |

FOREIGN PATENT DOCUMENTS

| 1028630 | 5/1966 | United Kingdom . |
| 1309446 | 3/1973 | United Kingdom . |
| 2103997 | 3/1983 | United Kingdom . |

Primary Examiner—William J. Van Balen
Attorney, Agent, or Firm—William R. Hinds

[57] ABSTRACT

A thermal insulation layer, suitable for use in a duvet, comprises a convection inhibiting structure and at least one surface with a low thermal emissivity. The structure may be a flexible cellular foam sheet or a web of fibrous material, while the low emissivity surface may be a coating on the sheet or on a thin flexible thermally insulating film. Perforations are provided through the foam sheet or the film to permit diffusion of water vapour through the layer, and the layer may include an additional web of fibrous material or feathers adjacent to the low emissivity surface.

16 Claims, 5 Drawing Figures

THERMAL INSULATION LAYER

This invention relates to thermal insulation layers and more particularly but not exclusively to lightweight layers for providing a thermal insulating covering about a person.

One example of such a thermal insulation layer is provided by a duvet, which is a relatively thick soft quilt containing a filling such as duck down, feathers, or synthetic fibres.

According to the invention there is provided a thermal insulation layer comprising a convection and conduction inhibiting structure and at least one substantially continuous low thermal emissivity surface, the layer being permeable for the diffusion of vapour therethrough. The structure may comprise a web of fibrous material, preferably of high voidage, and the low thermal emissivity surface be provided by a coating on a surface of a relatively thin, flexible, thermally insulating substrate. The flexible substrate may be perforated to allow diffusion of water vapour.

Alternatively, the structure may comprise a cellular foam sheet, and the foam sheet desirably has a cell size of between about 0.1 mm and 2 mm, and may be parallel-sided, corrugated, or ridged in cross section. In the preferred form of the invention, two said low emissivity surfaces are provided one at each of the sides of the foam sheet. The foam sheet may be perforated to allow diffusion of water vapour.

The low thermal emissivity surface may be located on a surface of the foam sheet, or may be located on a flexible film adjacent to the foam sheet, and said flexible film may be spaced apart from at least part of the foam sheet by said corrugations or ridges.

The thermal insulation layer may in addition include a layer of high voidage material which may be adjacent to a said low thermal emissivity surface, said high voidage material conveniently being provided by a fibrous web of material.

The invention will now be further described by way of example only and with reference to FIGS. 1 to 5 of the accompanying drawings, which show diagrammatic, fragmentary, sectional views of thermal insulation layers.

Referring to FIG. 1, a thermal insulation layer 5 for use in a duvet comprises a polyethylene cellular foam sheet 10, about 3 mm thick, sufficiently flexible to drape over a person in use, the cellular structure having a cell size of about 1 mm. One form of a suitable foam sheet 10 is available from Jiffy Packaging Company, Winsford, Cheshire, England, under the name "Jiffyfoam". On each side of the foam sheet 10 is a film 12 of polypropylene, about 1.5 micrometers thick, with a coating 14 (shown exaggerated for clarity) of aluminium on the surface of each film 12 remote from the foam sheet 10. The coatings 14 provide low emissivity surfaces with an emissivity less than 0.2 for infra red radiation from an object of about 30° C. Adjacent to the coatings 14 are high voidage webs 16 of fibrous material such as Trevira polyester fibre, between 10 and 20 mm thick.

In order to allow water vapour to diffuse through the layer 5, perforations 18 are provided through the foam sheet 10, the films 12 and the coatings 14. The perforations 18 may be of diameter about 3 mm and occupy about 10% of the surface area of the sheet 10, being uniformly distributed over the surface area.

The layer 5 is used inside a conventional fabric duvet cover (not shown), and in use is draped over a person. The closed cells of the foam sheet 10 inhibit heat transfer by convection, and the coatings 14 inhibit heat transfer by radiation. In normal use of a conventional duvet, convection and radiation account for the major part of the heat transmission through the duvet, and thus the invention inhibits both these modes of heat transfer. It will be appreciated that the webs 16 provide a substantial voidage immediately adjacent to the two coatings 14, which is required if the coatings 14 are to function effectively as radiation inhibitors.

Although the coatings 14 have been described as being of aluminium, it will be appreciated that other appropriate smooth coatings may be used, for example a coating of a metal such as nickel or chromium, or of a dielectric material such as titanium oxide or bismuth oxide, or a multi-layer coating, to provide the required low thermal emissivity.

Figure 2:
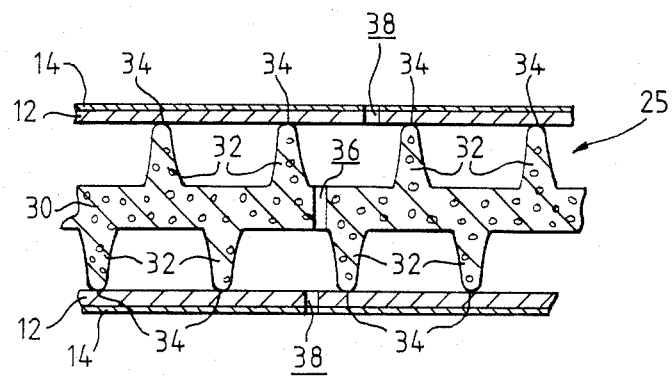

Referring now to FIG. 2 an alternative thermal insulation layer 25 for use in a duvet comprises a polyethylene foam ridged sheet 30 having a cellular structure with a cell size of about 0.5 mm, and with ridges 32 extending parallel to each other and defined along both surfaces of the sheet 30, the ridges 32 on one surface being staggered with respect to those on the other surface. At each side of the sheet 30 is a film 12 identical to that of FIG. 1 with a coating 14 of aluminium on the surface remote from the sheet 30. The films 12 contact the sheet 30 only along crests of the ridges 32, and bridge the gaps between the ridges 32. Perforations 36 and 38 through the sheet 30 and the films 12 respectively are provided to allow water vapour to diffuse through the layer 25. The layer 25 operates in the same manner as the layer 5 of FIG. 1, and to avoid contact between the coatings 14 and the cloth of the duvet cover (not shown), preferably a high voidage web (not shown) similar to the web 16 of FIG. 1 is provided adjacent to each coating 14. Alternatively the films 12 may be arranged with the coatings 14 on the sides nearer to the sheet 30 in which case a high voidage web is not required, although such an arrangement may inhibit heat transfer by radiation rather less effectively. If enhanced inhibition of radiant heat transfer is required, aluminium coatings may be applied to the surfaces of the ridged sheet 30.

Figure 3:
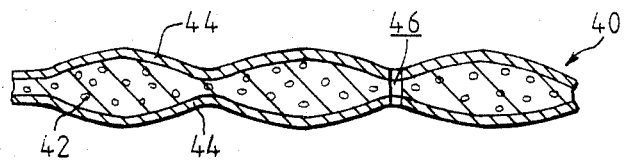

In FIG. 3, another alternative thermal insulation layer 40 is shown for use in a duvet, comprising a flexible polyethylene foam corrugated sheet 42 whose thickness undulates between 2 mm and 6 mm. Each of the surfaces of the sheet 42 is coated with a respective layer 44 of aluminium, and perforations 46 are defined through the layer 40.

Figure 4:
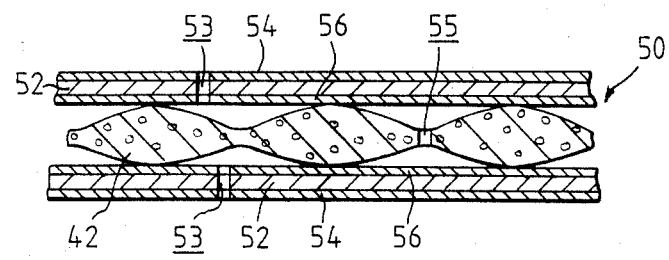

Referring now to FIG. 4, another alternative thermal insulation layer 50 for use in a duvet comprises a flexible polyethylene foam corrugated sheet 42 identical to that of FIG. 3 and, at each side of the sheet 42, a film 52 of polypropylene, about 5 micrometers thick, with coatings 54, 56 of aluminium on both surfaces of the film 52. The films 52 only contact the sheet 42 along the thickest portions of the sheet 42. Perforations 53 and 55 are defined through the films 52 and the sheet 42 respectively.

It will be appreciated that the layers 40 and 50 (of FIGS. 3 and 4 respectively) may be used in conjunction with webs 16 of fibrous material (or a layer of other high voidage filling such as duck down or feathers) to provide voidage adjacent to the outer low emissivity coatings 44, 54 and so enable the coatings 44, 54 to function effectively as radiation inhibitors.

Figure 5:
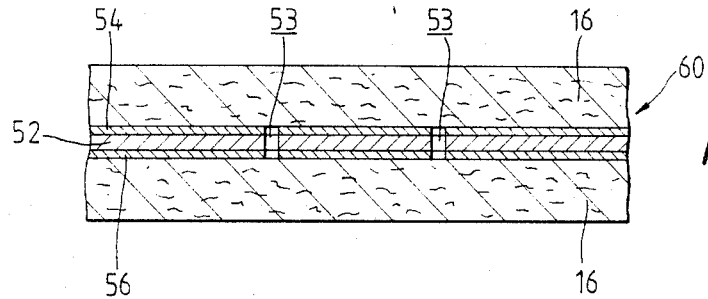

Referring to FIG. 5, another alternative thermal insulation layer 60 for use in a duvet comprises a film 52 of polypropylene identical to that of FIG. 4, with coatings 54, 56 of aluminium on both surfaces, and with perforations 53 through it. On each side of the film 52 is a high voidage web 16 of fibrous material, or a layer of other high voidage filling such as duck down or feathers, or a cellular blanket, which both enables the coatings 54 and 56 to function effectively as radiation inhibitors, and also inhibits convection.

It will be understood that although each layer 5, 25, 40, 50 and 60 has been described as for use as a duvet, each layer 5, 25, 40, 50 and 60 may be used in other applications such as insulating garments for people or for animals, or in other domestic or industrial situations where a lightweight, flexible, thermal insulation layer is required. For some of these applications, where the coatings 14, 44, 54 would be free of contact with another component, the use of high voidage webs 16 adjacent to those coatings is not necessary.

If desired, the properties of the foam sheets may be modified by the addition of fillers, for example flame retardant additives such as antimony oxide, or ceramic fillers such as titanium dioxide. Additionally, the flexibility of the foam sheets might be modified by the use of additives, such as ethyl vinyl acetate to the polyethylene base. Although the foam sheets have been described as being of polyethylene, it will be appreciated that other low thermal conductivity cellular foam materials may be used.

It will also be appreciated that for some purposes the surfaces of the film 12 or 52 may provide a sufficiently low thermal emissivity, in which case no coating 14, 54 or 56 is required.

I claim:

1. A flexible thermal insulation layer comprising a substantially continuous sheet of permeable, conduction and convection inhibiting material, and including substantially continuous low thermal emissivity surfaces facing outwardly toward each side of the insulation layer, each outwardly-facing low thermal emissivity surface being vapour permeable and being covered by a layer of high voidage material.

2. A thermal insulation layer as claimed in claim 1 wherein said low thermal emissivity surfaces are provided at each surface of a relatively thin, thermally insulating, flexible substrate, through which are defined a plurality of perforations, and the conduction and convection inhibiting sheet is provided by one of the layers of high voidage material.

3. A thermal insulation layer as claimed in claim 1 wherein the thermal emissivity of said outwardly-facing low thermal emissivity surfaces is less than about 0.2 for infrared radiation from an object of about 30° C.

4. A thermal insulation layer as claimed in claim 2 wherein the low emissivity surfaces are provided by a coating on the surfaces of the flexible substrate.

5. A thermal insulation layer as claimed in claim 2 wherein the perforations are of diameter about 3 mm and occupy about 10% of the area of the flexible substrate.

6. A thermal insulation layer as claimed in claim 1 wherein the convection and conduction inhibiting structure comprises a cellular foam sheet, through which are defined a plurality of perforations.

7. A thermal insulation layer as claimed in claim 6 wherein the cellular foam sheet has a cell size of between about 0.1 mm and 2 mm.

8. A thermal insulation layer as claimed in claim 6 wherein the cellular foam sheet is parallel sided in cross-section.

9. A thermal insulation layer as claimed in claim 6 wherein the cellular foam sheet is corrugated in cross-section, or ridged in cross-section.

10. A thermal insulation layer as claimed in claim 6 wherein the perforations are of diameter about 3 mm and occupy about 10% of the surface area of the cellular foam sheet.

11. A thermal insulation layer as claimed in claim 6 wherein a low emissivity surface is provided at a surface of the cellular foam sheet.

12. A thermal insulation layer as claimed in claim 11 wherein a low emissivity surface is provided at each surface of the cellular foam sheet.

13. A thermal insulation layer as claimed in claim 11 wherein a low emissivity surface is provided by a coating on the surface of the cellular foam sheet.

14. A thermal insulation layer as claimed in claim 6 further comprising a relatively thin, thermally insulating, flexible substrate having a low emissivity surface, and through which substrate are defined a plurality of perforations.

15. A thermal insulation layer as claimed in claim 9 further comprising a relatively thin, thermally insulating, flexible substrate having a low emissivity surface and spaced apart from at least part of the cellular foam sheet by the corrugations or ridges, and through which substrate are defined a plurality of perforations.

16. A thermal insulation layer as claimed in claim 4 wherein the perforations are of diameter about 3 mm and occupy about 10% of the area of the flexible substrate.

* * * * *

UNITED STATES PATENT AND TRADEMARK OFFICE
CERTIFICATE OF CORRECTION

PATENT NO. : 4,525,406
DATED : June 25, 1985
INVENTOR(S) : JAMES F. POLLOCK

It is certified that error appears in the above—identified patent and that said Letters Patent is hereby corrected as shown below:

On the first page of the printed patent, at column 1, the name of the assignee is corrected as follows:

[73] Assignee: United Kingdom Atomic Energy Authority, London, England

[SEAL]

Signed and Sealed this

Fifth Day of November 1985

Attest:

Attesting Officer

DONALD J. QUIGG

Commissioner of Patents and Trademarks